(No Model.) 5 Sheets—Sheet 1.
J. J. PFENNINGER.
BAKE OVEN.
No. 517,125. Patented Mar. 27, 1894.
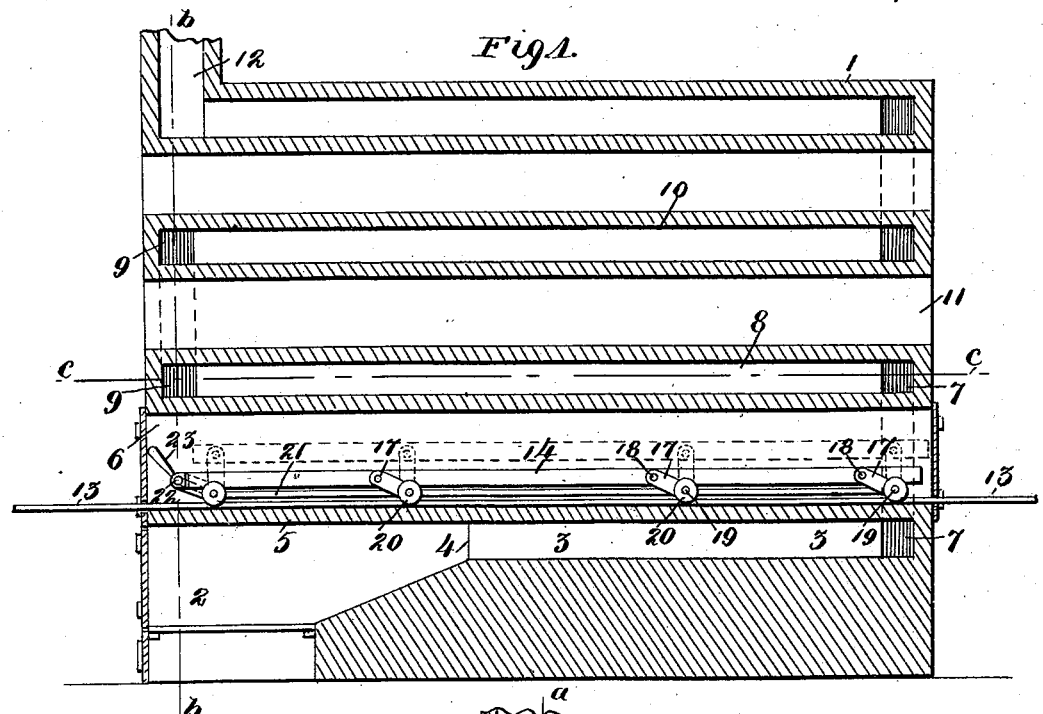
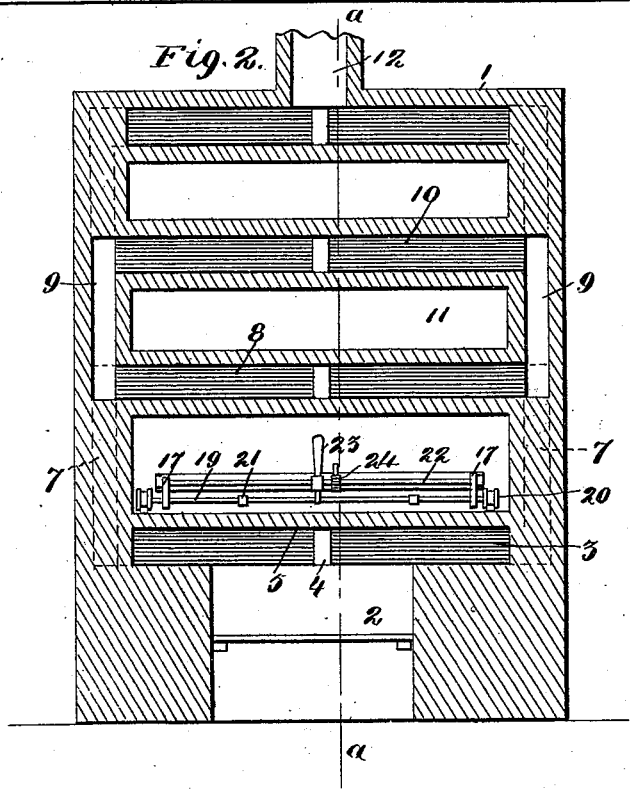
Witnesses
James J. O'Donohoe
J. F. Vastine
Inventor
J. J. Pfenninger.
By his Attorneys,
Keller & Starek
THE NATIONAL LITHOGRAPHING COMPANY,
WASHINGTON, D. C.

(No Model.) 5 Sheets—Sheet 2.
J. J. PFENNINGER.
BAKE OVEN.
No. 517,125. Patented Mar. 27, 1894.
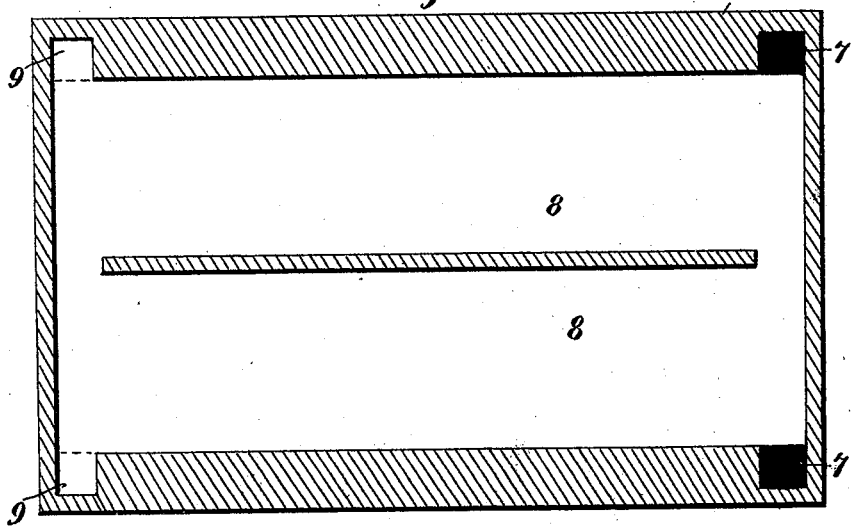
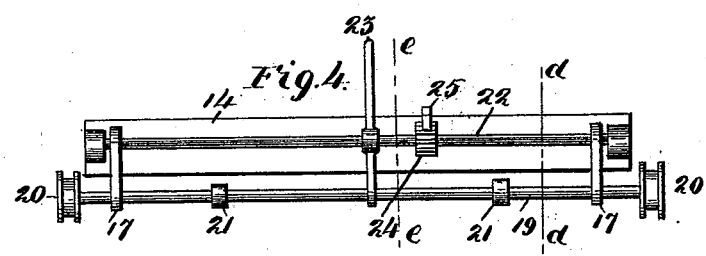
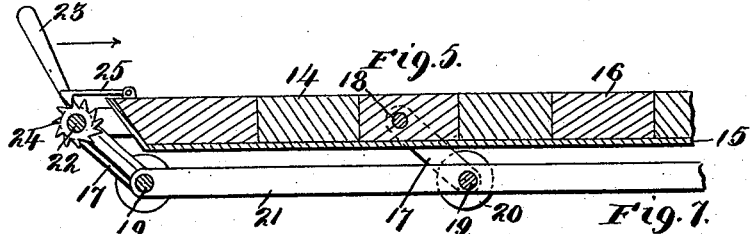
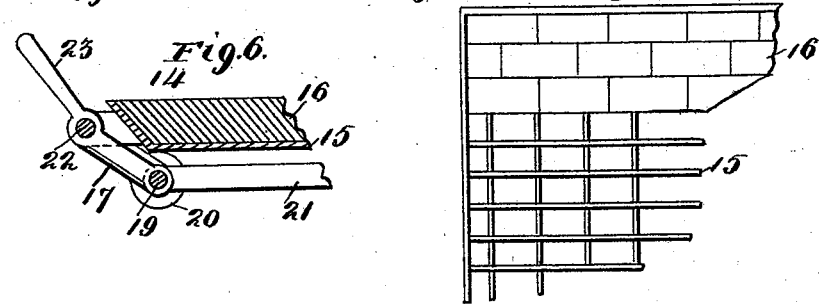
Witnesses
Inventor
J. J. Pfenninger
By his Attorneys (No Model.) 5 Sheets—Sheet 3.
J. J. PFENNINGER.
BAKE OVEN.
No. 517,125. Patented Mar. 27, 1894.
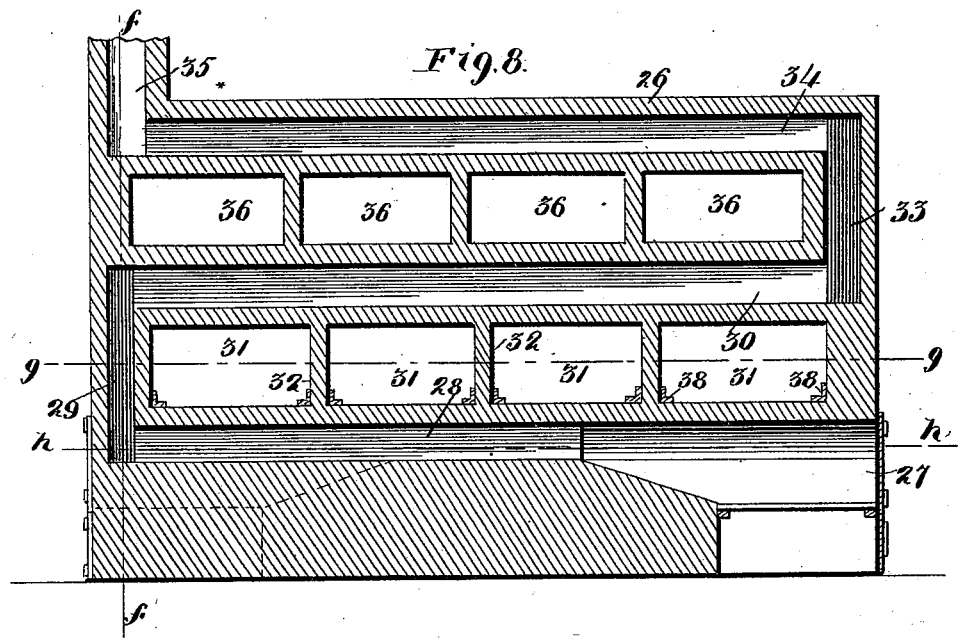
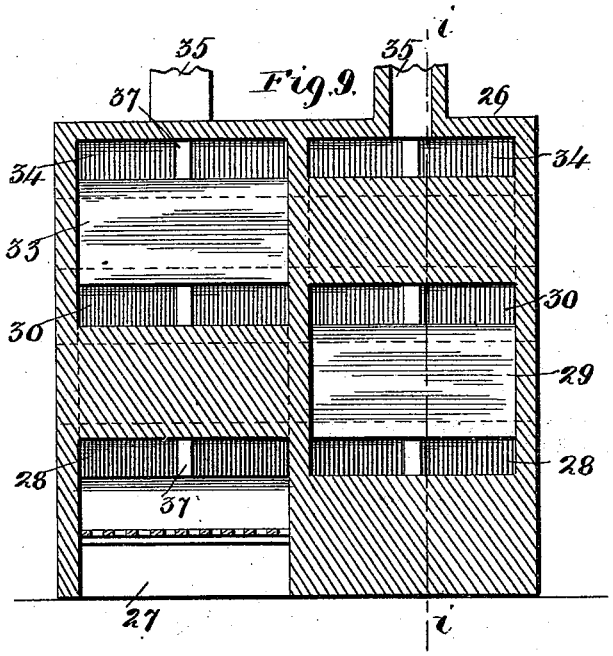
Witnesses
James J. O'Donoho
C. P. Vastine
Inventor
J. J. Pfenninger.
By his Attorneys,
Keller & Starek
THE NATIONAL LITHOGRAPHING COMPANY,
WASHINGTON, D. C.

(No Model.) 5 Sheets—Sheet 4.
J. J. PFENNINGER.
BAKE OVEN.
No. 517,125. Patented Mar. 27, 1894.
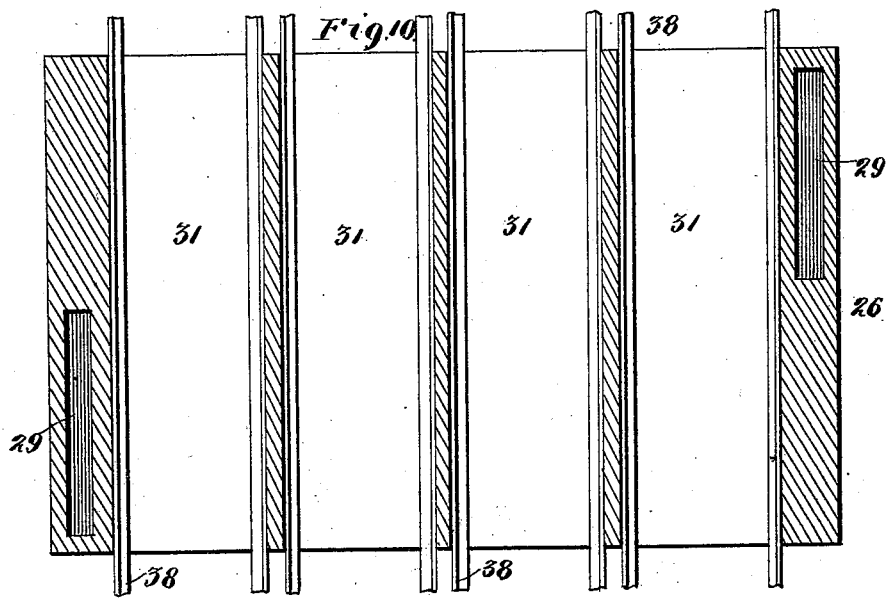
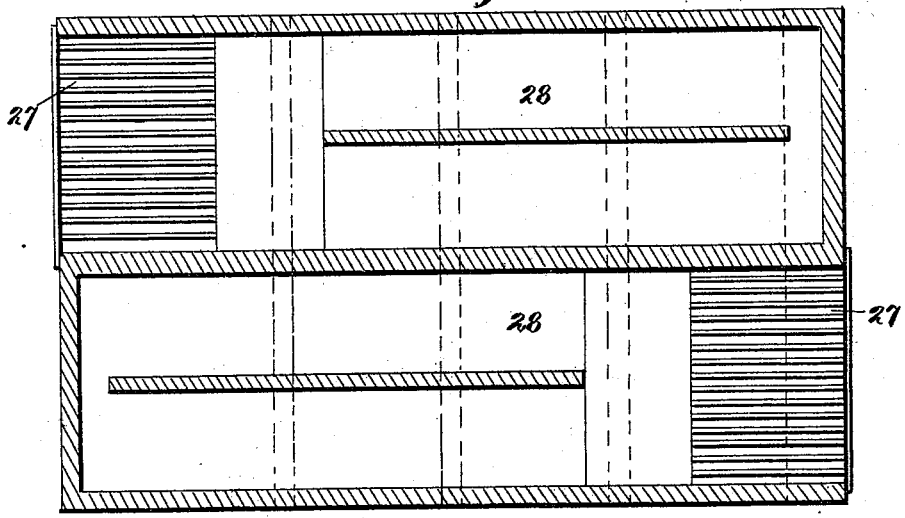
Witnesses
James J. O'Donohoe
O. P. Vastine
Inventor
J. J. Pfenninger.
By his Attorneys,
Keller Starek
THE NATIONAL LITHOGRAPHING COMPANY,
WASHINGTON, D. C.

(No Model.) 5 Sheets—Sheet 5.

J. J. PFENNINGER.
BAKE OVEN.

No. 517,125. Patented Mar. 27, 1894.

Witnesses
James J. Aldworth
JP Vastine

Inventor
J. J. Pfenninger.
By his Attorneys
Keller & Starck

UNITED STATES PATENT OFFICE.

JOHN JACOB PFENNINGER, OF ST. LOUIS, MISSOURI.

BAKE-OVEN.

SPECIFICATION forming part of Letters Patent No. 517,125, dated March 27, 1894.

Application filed July 26, 1893. Serial No. 481,487. (No model.)

*To all whom it may concern:*

Be it known that I, JOHN JACOB PFENNINGER, of the city of St. Louis, State of Missouri, have invented certain new and useful Improvements in Bake-Ovens, of which the following is a full, clear, and exact description, reference being had to the accompanying drawings, forming a part hereof.

My invention has relation to improvements in bake ovens and consists in the novel arrangement and combination of parts more fully set forth in the specification and pointed out in the claims.

Figure 12:
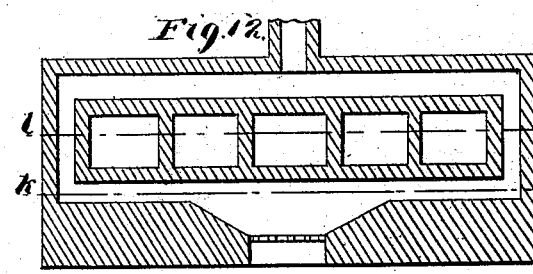
Figure 15:
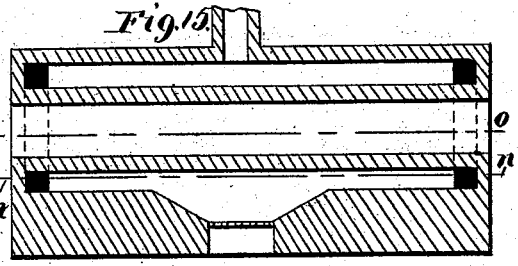
Figure 13:
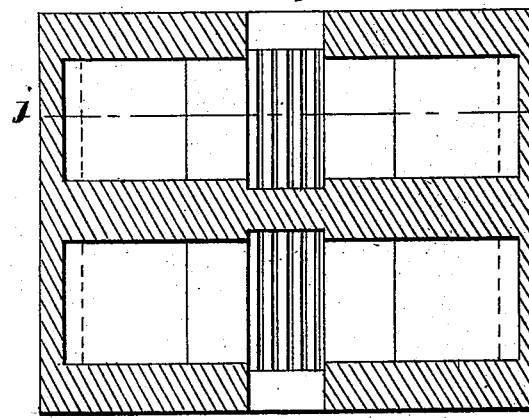
Figure 16:
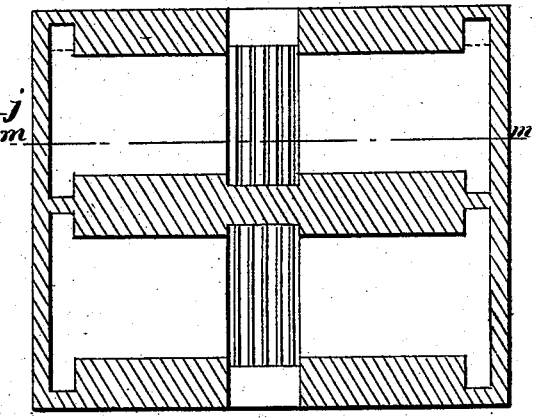
Figure 14:
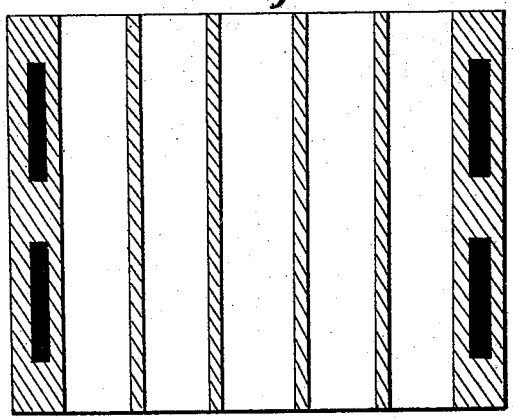
Figure 17:
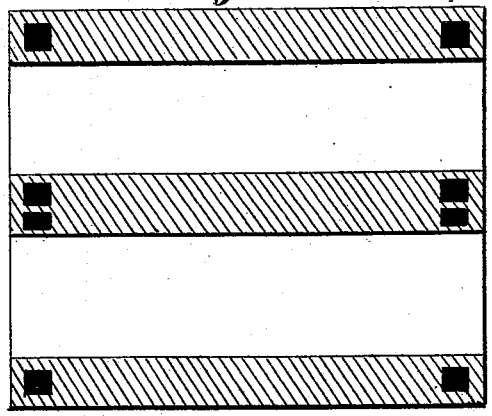

In the drawings, Figure 1 is a vertical longitudinal section of the oven taken on an old form of line $a$—$a$ of Fig. 2 and showing the movable bottom applied thereto. Fig. 2 is a vertical transverse section taken on the line $b$—$b$ of Fig. 1. Fig. 3 is a horizontal cross-section taken on the line $c$—$c$ of Fig. 1. Fig. 4 is an end view of the movable bottom of the oven. Fig. 5 is a vertical longitudinal section of the movable bottom taken on the line $d$—$d$ of Fig. 4. Fig. 6 is a similar view taken on the line $e$—$e$ of Fig. 4. Fig. 7 is a top plan view of the movable bottom with parts broken away. Fig. 8 is a vertical longitudinal section of another form of furnace taken on the line $i$—$i$ of Fig. 9. Fig. 9 is a vertical transverse section taken on the line $f$—$f$ of Fig. 8. Fig. 10 is a horizontal longitudinal section taken on the line $g$—$g$ of Fig. 8. Fig. 11 is a similar view taken on the line $h$—$h$ of Fig. 8. Fig. 12 is a further modification of my invention, being a vertical longitudinal section taken on the line $j$—$j$ of Fig. 13. Fig. 13 is a horizontal longitudinal section taken on the line $k$—$k$ of Fig. 12. Fig. 14 is a similar view taken on the line $l$—$l$ of Fig. 12. Fig. 15 is a vertical longitudinal section taken on the line $m$—$m$ of Fig. 16 showing a further modification of my invention. Fig. 16 is a horizontal longitudinal section taken on the line $n$—$n$ of Fig. 15; and Fig. 17 is a similar view taken on the line $o$—$o$ of Fig. 15.

The object of my invention is to construct a bake oven that will thoroughly utilize the heat imparted by the products of combustion and further to equalize the heat throughout the oven.

Another object of the invention is to provide the oven with a removable bottom upon which the dough to be baked is placed, thus dispensing with the contrivances generally employed to insert and remove the bread from the oven. An oven provided with a removable bottom as shown and to be hereinafter described can either be mounted upon wheels or slid upon tracks and operated by any suitable mechanism, whereby the bottom may be moved slowly into and out of the oven, the bread so placed upon the bottom and inserted from one end of the oven being baked when delivered from the opposite end.

Another object of the invention is to employ mechanism for adjusting the bottom vertically within the baking chamber of the oven whereby the proper amount of heat is suitably distributed to the different parts of the dough.

Referring to the drawings, and particularly to Figs. 1, 2, 3, 4, 5, 6, and 7,—1 represents the oven which is constructed of suitable material within which the several flues and baking compartments are located; 2 represents the fire chamber which is arranged at the bottom of the oven and near one end thereof, and leading from said fire chamber rearwardly is a flue 3 divided by a partition wall 4 which supports the stationary bottom 5 of the lower baking compartment 6. 7 represents end flues which are located on either side of one end of the baking compartment 6, and are in communication with the flue 8 located immediately above the said baking compartment. The opposite end of the flue 8 is in communication with the side vertical flues 9 located at the opposite end of the oven, and said side flues are in turn in communication with a flue 10 also traversing the entire length of the oven, the flues 10 and 8 forming a second baking compartment 11. Thus it will be seen that any number of baking compartments may be constructed by carrying on indefinitely a similar arrangement of flues, the last one of which terminates in a stack 12 for carrying off the products of combustion. Secured to the bottom 5 of the baking compartment 6 are two tracks 13 which extend a suitable distance beyond the ends of the oven, and upon which a movable bottom 14 is adapted to be moved, in which instance the dough to be baked is directly placed upon the bottom. In constructing the bottom, I form a metallic frame 15 as clearly shown in Fig. 7 upon which the bricks 16 forming the body of the bottom are placed. 17 represents plates one end of which is movably secured to the bottom 14 by bolts or shafts 18 passing through the same and the ends of said plates. 19 represents a second set of shafts which pass through the opposite ends of said plates, and keyed to the ends of said shafts are the wheels 20 which move upon the tracks 13. All of the shafts 19 are connected to one another by bars 21 so that all of them and likewise the wheels carried by the same will be moved simultaneously. The plates 17 located at the operating end of the bottom 14 are keyed to an independent shaft 22, the opposite ends of said plates supporting loosely a shaft 19 forming one of the series of shafts above referred to. Also fixed to the shaft 22 is a lever 23 the lower end of which embraces loosely the forward shaft 19 whereby, when said lever is moved in the direction as shown in Fig. 5 by the arrow, all of the wheels 20 will be moved simultaneously and the bottom 14 elevated. Fixed to the shaft 22 is a ratchet wheel 24 which engages with a pawl 25 movably fixed to the bottom 14 which prevents the said shaft from being moved in one direction after the wheels 20 have been properly adjusted, and consequently holds the bottom in its adjusted position.

The form of oven shown in Figs. 1, 2, and 3 is not claimed herein, such being old, but is merely illustrated to show the application thereto of the movable bottom.

In Figs. 8, 9, 10 and 11 I have shown my preferred form of oven, that is, one having a series of transverse baking compartments the flues being in direct communication with one another, and dispensing with the side flues made use of in the construction above described. 26 represents the oven which is provided with a fire chamber 27 located at the bottom of the same and adjacent to one end thereof. Leading from said fire chamber is a flue 28 leading to and in communication with a vertical flue 29 which in turn is in communication with a longitudinal flue 30, the baking compartments 31 being formed by the walls of said flues, and partition walls 32. 33 represents a second vertical end flue the lower end of which is in communication with the longitudinal flue 30 and the upper end thereof in communication with a longitudinal flue 34 leading to the stack 35, whereby a second series of transverse baking compartments 36 is formed. To support the walls which form the longitudinal flues, and further to divide the products of combustion on their way to the stack, I employ division walls 37 as best shown in Figs. 9 and 11.

The description above has reference to only one side of the furnace, the opposite side being an exact duplication, excepting the fire chamber which is located at the opposite end of the oven and the flues run in the opposite direction; or in other words the oven is reversed, there being a separate stack for each section, as best shown in Figs. 9 and 11. The transverse baking compartments 31 are provided with tracks 38 upon which the pans containing the dough to be cooked are moved.

In Figs. 12, 13, and 14, I have shown a further modification of my invention, the flues and baking compartments being arranged similarly to those shown in Fig. 8, the difference being in the location of the fire chambers which in the present instance are arranged transversely, and are located about midway between the ends of the oven.

In Figs. 15, 16, and 17, the arrangement of flues and baking compartments is similar to those shown in Fig. 1 with the exception of the fire chambers which are arranged similar to those shown in Figs. 12, 13, and 14, that is, transverse to the direction of the flues.

Having described my invention, what I claim is—

1. A bake oven comprising a fire chamber, a longitudinal flue leading therefrom, a vertical end flue communicating therewith, a second longitudinal flue leading from said vertical flue, a series of transverse division walls interposed between the walls of said longitudinal flues, said division walls forming a series of adjacent transverse baking compartments, substantially as set forth.

2. A bake oven comprising two fire chambers, a longitudinal wall separating the same, said fire chambers being located on opposite sides of either end of said division wall, longitudinal flues leading in opposite directions from said fire chambers, vertical end flues leading from said longitudinal flues, a second series of longitudinal flues leading in opposite directions from said end flues, a series of transverse division walls located between the walls of said longitudinal flues forming a series of adjacent transverse baking compartments, and longitudinal supporting division walls for said series of baking compartments, dividing the longitudinal flues, substantially as set forth.

3. A bake oven comprising a baking compartment, tracks secured within the same and projecting at either end of the oven, a movable bottom 14 composed of a metallic frame 15 and bricks 16; shafts 18 passing through the bottom, plates 17 secured to said shafts, shafts 19 also carried by said plates, wheels 20 adjustably secured to said bottom, bars 21 connecting said last named shafts, a shaft 22 journaled to the bottom to which the forward plates 17 are keyed, a lever 23 fixed to said shaft 22 and loosely embracing the forward shaft 19, a ratchet 24 also fixed to the shaft 22 and a pawl 25 co-operating with said ratchet, substantially as set forth.

4. A bake oven comprising two fire chambers, a division wall separating the same, the said chambers being located on opposite sides of said wall, longitudinal flues leading from said fire chambers, end flues communicating with said longitudinal flues, a baking compartment superposed over each longitudinal flue, a second longitudinal flue passing over each baking compartment and communicating with the end flues, and exit flues from said second series of longitudinal flues, substantially as set forth.

In testimony whereof I affix my signature in the presence of two witnesses.

JOHN JACOB PFENNINGER.

Witnesses:
 HERMAN J. KREMBS,
 C. F. KELLER.